(12) United States Patent
Mani

(10) Patent No.: US 9,328,700 B2
(45) Date of Patent: May 3, 2016

(54) FUEL VAPOR PROCESSING APPARATUS

(71) Applicant: AISAN KOGYO KABUSHIKI KAISHA, Obu-shi, Aichi-ken (JP)

(72) Inventor: Takashi Mani, Takahama (JP)

(73) Assignee: Aisan Kogyo Kabushiki Kaisha (JP)

( * ) Notice: Subject to any disclaimer, the term of this patent is extended or adjusted under 35 U.S.C. 154(b) by 54 days.

(21) Appl. No.: 14/282,524

(22) Filed: May 20, 2014

(65) Prior Publication Data

US 2014/0352542 A1 Dec. 4, 2014

(30) Foreign Application Priority Data

Jun. 4, 2013 (JP) ................................. 2013-118141

(51) Int. Cl.
*F02M 25/08* (2006.01)
*B01D 53/04* (2006.01)

(52) U.S. Cl.
CPC ....... *F02M 25/0854* (2013.01); *B01D 53/0407* (2013.01); *F02M 25/0872* (2013.01); *B01D 2259/4516* (2013.01)

(58) Field of Classification Search
CPC .............. F02M 25/08; F02M 25/0854; F02M 25/0872; B01D 53/04; B01D 53/0407; B01D 2253/102; B01D 2259/4516
USPC ......................... 95/146; 96/131, 132; 123/519
See application file for complete search history.

(56) References Cited

U.S. PATENT DOCUMENTS

| | | | |
|---|---|---|---|
| 5,538,543 A | 7/1996 | Watanabe et al. | |
| 6,540,815 B1 * | 4/2003 | Hiltzik .................. | B01D 53/02 123/519 |
| 7,008,470 B2 * | 3/2006 | Makino .................. | B01D 53/02 123/519 |
| 7,322,343 B2 | 1/2008 | Yamada et al. | |
| 2012/0304865 A1 | 12/2012 | Sugiura et al. | |
| 2014/0060497 A1 * | 3/2014 | Akiyama ........... | F02M 25/0854 123/519 |
| 2015/0007799 A1 * | 1/2015 | Takeshita ........... | F02M 25/0854 123/519 |

FOREIGN PATENT DOCUMENTS

| | | |
|---|---|---|
| JP | 7-139442 H | 5/1995 |
| JP | A-2007-146793 | 6/2007 |
| JP | 2012-251431 A | 12/2012 |

OTHER PUBLICATIONS

Notification of Reason for Refusal, issued Jun. 2, 2015, in Korean Patent Application No. 10-2014-0060358.
First Office Action issued Feb. 3, 2016 in Chinese Patent Application No. 201410245031.3.

* cited by examiner

*Primary Examiner* — Frank Lawrence
(74) *Attorney, Agent, or Firm* — Wood, Phillips, Katz, Clark & Mortimer

(57) ABSTRACT

A fuel vapor processing apparatus including: a passage for fluid; a tank port and a purge port formed on one end side of the passage; an atmospheric air port formed on the other end side; and four or more adsorption layers filled with a fuel adsorbing material, wherein the main adsorption layer, and a region provided on the atmospheric air port side of the main adsorption layer are provided; the adsorption layers other than the main adsorption layer, and separation parts which separate the adjacent adsorption layers are provided in the region, and in the at least two separation parts inside the region, when the cross-sectional area of each of the at least two separation parts perpendicular to a flow direction of the passage is converted into a circular cross-sectional area, a distance between the adjacent adsorption layers is larger than the mean value of diameters of the each separation part.

6 Claims, 5 Drawing Sheets

FUEL VAPOR PROCESSING APPARATUS

BACKGROUND OF THE INVENTION

1. Field of the Invention

The present invention relates to a fuel vapor processing apparatus.

2. Background Art

Conventionally, to prevent emission of fuel vapor to the atmosphere from a fuel tank of a car, etc., a fuel vapor processing apparatus (hereinafter also called a canister) which temporarily adsorbs fuel components present in fuel vapor is used.

One of such canisters is known (JP-A-2007-146793) which includes: a casing formed with a tank port, a purge port, and an atmospheric air port; four adsorption layers filled with activated carbon and arranged in series inside the casing; and spaces, which are not filled with activated carbon, formed between the adjacent adsorption layers.

In the canister, the temperature significantly falls during purge in an adsorption layer which is close to the atmospheric air port when fuel components are desorbed from the activated carbon filling the adsorption layer. In the canister of the aforementioned conventional technology, in which the distance between the adjacent adsorption layers is insufficient, during purge the gas that decreased in temperature in the adsorption layer close to the atmospheric air port undergoes little increase in temperature in the space which is not filled with activated carbon before flowing into the next adsorption layer. This causes degradation of the desorption performance in the next adsorption layer and insufficient desorption of the fuel components. As a result, a larger amount of fuel components remains in the activated carbon after the purge, so that the fuel components can be blown off to the atmosphere.

In view of this, the present invention aims to provide a fuel vapor processing apparatus which reduces the amount of fuel components remaining in the adsorbing material after purge compared to the conventional canister, and thereby reduces the blow off of fuel components from the atmospheric air port to the outside.

The present invention allows a longer residence time of fuel components in the separation part, compared to the conventional canister, and a larger amount of increase (recovery) in gas temperature which decreased by desorption, since the region is provided on the atmospheric air port side of the main adsorption layer, and in the at least two separation parts provided in the region, when the cross-sectional area of each of the at least two separation parts perpendicular to the flow direction of the passage is converted into a circular cross-sectional area, the distance between the adjacent adsorption layers is larger than the mean value of diameters of the each separation part. Thus, the gas inside the fuel vapor processing apparatus of the present invention can be maintained at a higher temperature during purge compared to the conventional canister. Accordingly, the desorption performance of the adsorbing material can be improved and the amount of fuel components remaining after purge can be reduced compared to the conventional canister, so that the amount of blow off to the atmosphere can be reduced and the blow off suppression performance can be improved.

SUMMARY OF THE INVENTION

In one form, the invention is directed to a fuel vapor processing apparatus including: a passage for a fluid to flow through formed inside the apparatus; a tank port and a purge port formed on one end side of the passage; an atmospheric air port formed on other end side of the passage; and four or more adsorption layers provided in the passage. The four or more adsorption layers are filled with an adsorbing material capable of adsorbing fuel components. The fuel vapor processing apparatus further includes a main adsorption layer and a region provided on the atmospheric air port side of the main adsorption layer. The region is provided with three or more adsorption layers other than the main adsorption layer and separation parts which separate the adjacent adsorption layers. In at least two separation parts inside the region, when a cross-sectional area of each of the at least two separation parts perpendicular to a flow direction of the passage is converted into a circular cross-sectional area, a distance between the adjacent adsorption layers is set larger than the mean value of diameters of the each separation part.

In one form, a distance between adjacent adsorption layers in the region is set longer as a separation part separating the adjacent adsorption layers is closer to the atmospheric air port.

In one form, an adsorption layer which is positioned closest to the atmospheric air port in the region is constituted of activated carbon having a butane working capacity according to ASTM D5228 of 14.5 g/dL or larger.

In one form, the adsorption layer which is disposed closest to the tank port in the fuel vapor processing apparatus is constituted of pulverized carbon.

In one form, the volume of the adsorption layers in the region is 12% or less of a total volume of the adsorption layers in the fuel vapor processing apparatus.

In one form, the ratio between the cross-sectional area perpendicular to the flow direction of the passage in an adsorption layer in the region and the cross-sectional area perpendicular to the flow direction of the passage in the main adsorption layer is within a range of 1:2.5 to 1:4.5.

DETAILED DESCRIPTION OF THE PREFERRED EMBODIMENT

Embodiments for implementing the present invention will be described on the basis of the drawings.

Embodiment 1

Figure 1:
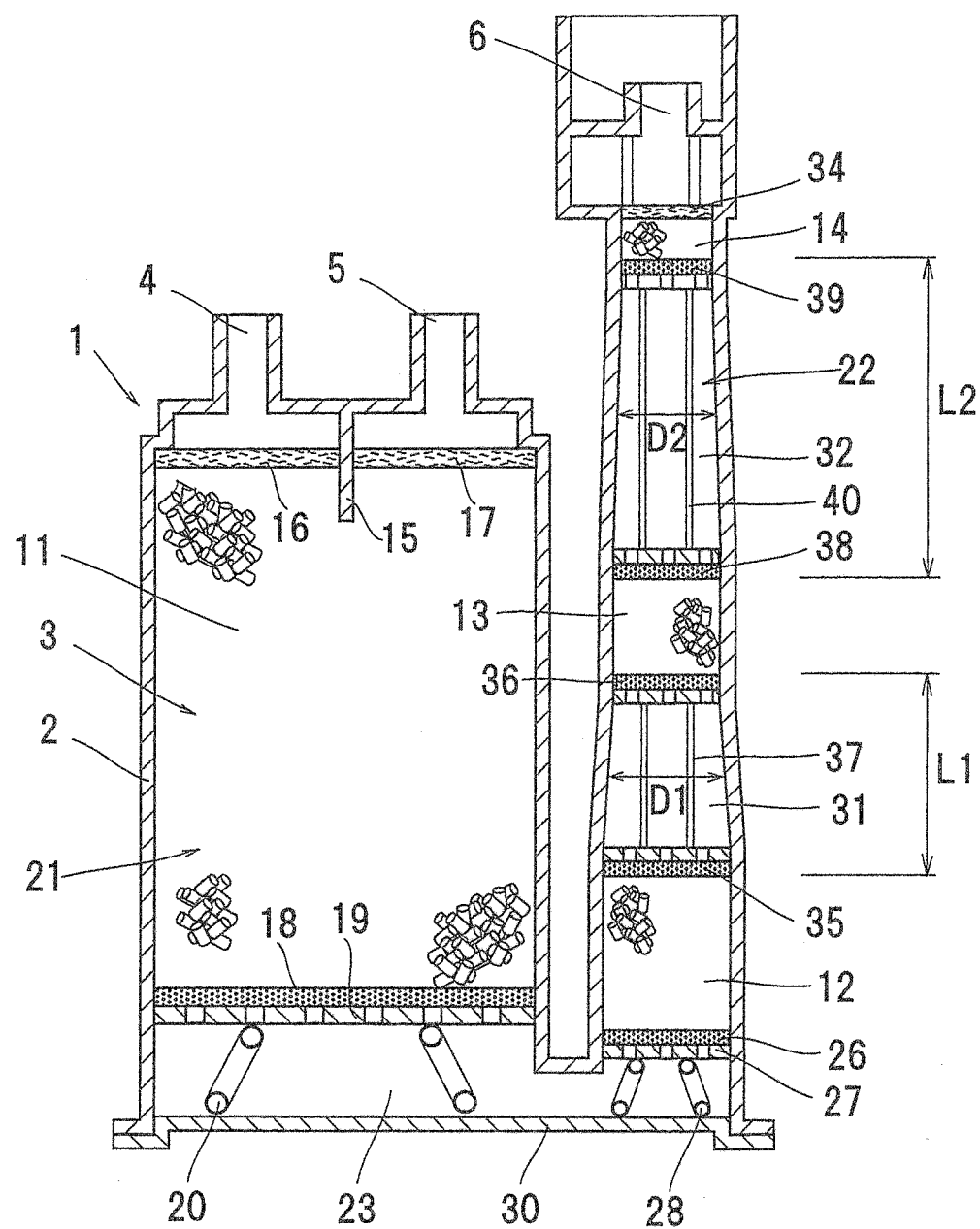
FIG. 1 is a schematic view illustrating a fuel vapor processing apparatus according to Embodiment 1 of the present invention.

FIG. 1 shows Embodiment 1 of the present invention.

As shown in FIG. 1, a fuel vapor processing apparatus 1 of the present invention includes: a casing 2; a passage 3 for a fluid to flow through formed inside the casing 2; a tank port 4 and a purge port 5 formed in an end part on one end side of the passage 3 in the casing 2; and an atmospheric air port 6 formed in an end part on the other end side.

Four adsorption layers, namely, a first adsorption layer 11, a second adsorption layer 12, a third adsorption layer 13, and a fourth adsorption layer 14, each filled with an adsorbing material capable of adsorbing vaporized fuel components are arranged in series in the passage 3. In this embodiment, activated carbon is used as the adsorbing material.

As shown in FIG. 1, a first region 21 communicating with the tank port 4 and the purge port 5, and a second region 22 communicating with the atmospheric air port 6 are formed inside the casing 2, and the first region 21 and the second region 22 are communicating with each other through a space 23 formed inside the casing 2 on the side opposite to the atmospheric air port 6, so that a fluid flowing through the passage 3 turns around in the space 23 and flows substantially in a U-shape.

The tank port 4 communicates with an upper air chamber of a fuel tank (not shown), and the purge port 5 is connected to an intake air passage of an engine through a purge control valve (VSV) (not shown). The opening degree of this purge control valve is controlled by an electronic control unit (ECU), and purge control is performed during operation of the engine on the basis of measured values, etc. of an NF sensor and the like. The atmospheric air port 6 communicates with the outside through a passage (not shown).

In the first region 21, the first adsorption layer 11 is formed, which is a main adsorption layer with the largest volume of the four adsorption layers 11 to 14 and filled with activated carbon serving as the adsorbing material at a predetermined density. While granulated carbon or pulverized carbon can be used as this activated carbon, pulverized carbon is used in this embodiment. To make it clear that the first adsorption layer 11 is constituted of activated carbon, the first adsorption layer is depicted with granulated carbon in the drawings.

A baffle plate 15, which extends from an inner surface of the casing 2 to a part of the first adsorption layer 11, is provided between the tank port 4 and the purge port 5 in the casing 2. The baffle plate 15 causes a fluid flowing between the tank port 4 and the purge port 5 to flow through the first adsorption layer 11.

The tank port 4 side and the purge port 5 side of the first adsorption layer 11 are covered respectively with a filter 16 made of non-woven fabric, etc. and a filter 17 made of non-woven fabric, etc. A filter 18 made of urethane, etc. is provided on a surface of the first adsorption layer 11 on the space 23 side so as to cover the entire surface, and a plate 19 having many communication holes is provided on the space 23 side of the filter 18. The plate 19 is biased toward the tank port 4 by biasing means 20 such as a spring.

A second adsorption layer 12 with activated carbon serving as the adsorbing material filled at a predetermined density is formed on the space 23 side of the second region 22. While granulated carbon or pulverized carbon can be used as this activated carbon, granulated carbon is used in this embodiment.

A filter 26 made of urethane, etc. is provided on the space 23 side of the second adsorption layer 12 so as to cover the entire surface. A plate 27 with many communication holes almost evenly formed over the entire surface is provided on the space 23 side of the filter 26. The plate 27 is biased toward the atmospheric air port 6 by a biasing member 28 such as a spring.

The space 23 is formed between the plates 19, 27 and a cover plate 30 of the casing 2, and the space 23 allows communication between the first adsorption layer 11 and the second adsorption layer 12.

The third adsorption layer 13 with activated carbon serving as the adsorbing material filled at a predetermined density is formed on the atmospheric air port 6 side of the second adsorption layer 12 in the second region 22. While granulated carbon or pulverized carbon can be used as this activated carbon, granulated carbon is used in this embodiment.

A first separation part 31 which separates the adsorption layers 12 and 13 by a predetermined distance L1 is provided between an end surface on the atmospheric air port 6 side of the second adsorption layer 12 and an end surface on the space 23 side of the third adsorption layer 13. While the first separation part 31 can be formed in any shape, in this embodiment, the first separation part 31 has a smaller inner diameter toward the atmospheric air port 6.

Filters 35 and 36 made of urethane, etc. are respectively provided at an end part on the second adsorption layer 12 side and an end part on the third adsorption layer 13 side of the first separation part 31 so as to cover the entire surfaces. A space forming member 37 which can separate the filters 35 and 36 by a predetermined distance is provided between the filters 35 and 36.

The fourth adsorption layer 14 filled with activated carbon serving as the adsorbing material at a predetermined density is formed on the atmospheric air port 6 side of the third adsorption layer 13 in the second region 22. While granulated carbon or pulverized carbon can be used as this activated carbon, in this embodiment, high-performance activated carbon having a butane working capacity (BWC) according to ASTM D5228 of 14.5 g/dL or larger is used. However, the same activated carbon as that constituting the second adsorption layer 12 or the third adsorption layer 13 may be used as the activated carbon constituting the fourth adsorption layer 14. A filter 34 made of non-woven fabric, etc. is provided on the atmospheric air port 6 side of the fourth adsorption layer 14 so as to cover the entire end surface.

A second separation part 32 which separates the adsorption layers 13 and 14 by a predetermined distance L2 is provided between an end surface on the atmospheric air port 6 side of the third adsorption layer 13 and an end surface on the space 23 side of the fourth adsorption layer 14. While the second separation part 32 may be formed in any shape, the second separation part has a smaller inner diameter toward the atmospheric air port 6 in this embodiment.

Filters 38 and 39 made of urethane, etc. are provided respectively at an end part on the third adsorption layer 13 side and an end part on the fourth adsorption layer 14 side of the second separation part 32 so as to cover the entire surfaces. A space forming member 40 which can separate the filters 38 and 39 by a predetermined distance is provided between the filters 38 and 39.

The separation parts 31 and 32 are provided with no adsorbing material.

As long as the adjacent adsorption layers can be separated by a predetermined distance, the separation parts 31 and 32 may be constituted, for example, of a filter made of urethane, etc. alone or of the space forming members 37 and 40 alone.

In the first separation part 31, when the cross-sectional area perpendicular to the flow direction of the passage 3 is converted into a circle having the same cross-sectional area, the distance L1 separating the second adsorption layer 12 and the third adsorption layer 13 is larger than the mean value of diameters D1 (exemplary indicated in FIG. 1 to show the direction of D1) of the entire first separation part 31 in the flow direction (hereinafter called the mean value of the diameters D1). In this embodiment, the distance L1 is 90 mm, and the mean value of the diameters D1 is 50.3 mm.

It is preferable that, in the second separation part 32, when the cross-sectional area perpendicular to the flow direction of the passage 3 is converted into a circle having the same cross-sectional area, the distance L2 separating the third adsorption layer 13 and the fourth adsorption layer 14 is larger than the mean value of diameters D2 (exemplary indicated in FIG. 1 to show the direction of D2) of the entire second separation part 32 in the flow direction (hereinafter called the mean value of the diameters D2), and moreover, that the distance L2 is twice the mean value of the diameters D2 or larger. In this embodiment, the distance L2 is 140 mm, and the mean value of the diameters D2 is 45.3 mm.

The distance L2 separating the third adsorption layer 13 and the fourth adsorption layer 14 is longer than the distance L1 separating the second adsorption layer 12 and the third adsorption layer 13. That is, it is preferable that, in the second region 22, the closer the separation part to the atmospheric air port 6, the longer the distance between the adjacent adsorption layers, and moreover, that the distance L2 is 1.5 times the distance L1 or larger.

The total of the volumes of the adsorption layers 12, 13, and 14 inside the second region 22 is set 12% or less of the total volume of all the adsorption layers inside the fuel vapor processing apparatus 1.

The ratio between the cross-sectional area perpendicular to the flow direction of the passage 3 in the adsorption layers 12, 13, and 14 inside the second region 22, and the cross-sectional area perpendicular to the flow direction of the passage 3 in the first adsorption layer 11 is set within the range of 1:2.5 to 1:4.5.

The cross-sectional areas of the second adsorption layer 12, the third adsorption layer 13, and the fourth adsorption layer 14 perpendicular to the flow direction of the passage 3 may be equal along the entire passage 3 in the flow direction, or may be smaller toward the atmospheric air port 6.

The above-described configuration causes the gas containing fuel vapor flowing from the tank port 4 into the fuel vapor processing apparatus 1 to have its fuel components adsorbed by the adsorbing material inside the adsorption layers 11 to 14 before being emitted from the atmospheric air port 6 to the atmosphere.

On the other hand, during the purge control while the engine is in operation, the purge control valve is opened by the electronic control unit (ECU), and the air having been suctioned from the atmospheric air port into the fuel vapor processing apparatus 1 due to the negative pressure in the air intake passage flows in the direction opposite to the gas flow described above, and is supplied from the purge port 5 to the air intake passage of the engine. During this process, the fuel components adsorbed by the adsorbing material inside the adsorption layers 11 to 14 are desorbed and supplied to the engine along with the air.

The fuel vapor processing apparatus 1 of the present invention, which has the above-described structure and configuration, provides the following effects and advantages.

The residence time of the fuel components in the separation parts 31 and 32 can be made longer compared to the conventional canister, and the amount of increase (recovery) in gas temperature reduced by desorption in the adsorption layer can be made larger, since in the separation part 31 (32), when the cross-sectional area perpendicular to the flow direction of the passage 3 is converted into a circle having the same cross-sectional area, the distance L1 (L2) separating the adjacent adsorption layers 12 and 13 (13 and 14) is larger than the mean value of the diameters of the entire separation part 31 (32) in the flow direction. Thus, a higher temperature of the gas flowing into the adjacent adsorption layer can be achieved compared to the conventional canister, and the performance of desorbing fuel components in the adsorbing material of the adjacent adsorption layer can be maintained at a high level. Accordingly, the amount of fuel components remaining inside the fuel vapor processing apparatus 1 after purge can be reduced compared to the conventional canister, so that the amount of blow off of the fuel components to the atmosphere can be reduced and the blow off suppression performance can be improved.

During purge, the closer the adsorption layer to the atmospheric air port 6, the larger the difference in gas temperature between the inlet and outlet of the adsorption layer. Therefore, if the residence time can be made longer and the amount of recovery (amount of increase) in reduced gas temperature can be made larger in the separation part which is positioned closer to the atmospheric air port where the temperature fall is large, the desorption performance of the adsorbing material can be maintained at a high level, and the efficiency of desorbing the fuel components from the adsorbing material in the adsorption layer on the tank port 4 side of the separation part can be improved.

The present invention has therefore made the lengths L1 and L2 in the flow direction of the separation parts 31 and 32 longer in the separation part closer to the atmospheric air port 6, to thereby make the residence time longer and the amount of increase in the reduced gas temperature larger in the separation part closer to the atmospheric air port 6. Thus, the desorption performance of the fuel vapor processing apparatus 1 has been successfully improved.

Embodiment 2

Figure 2:
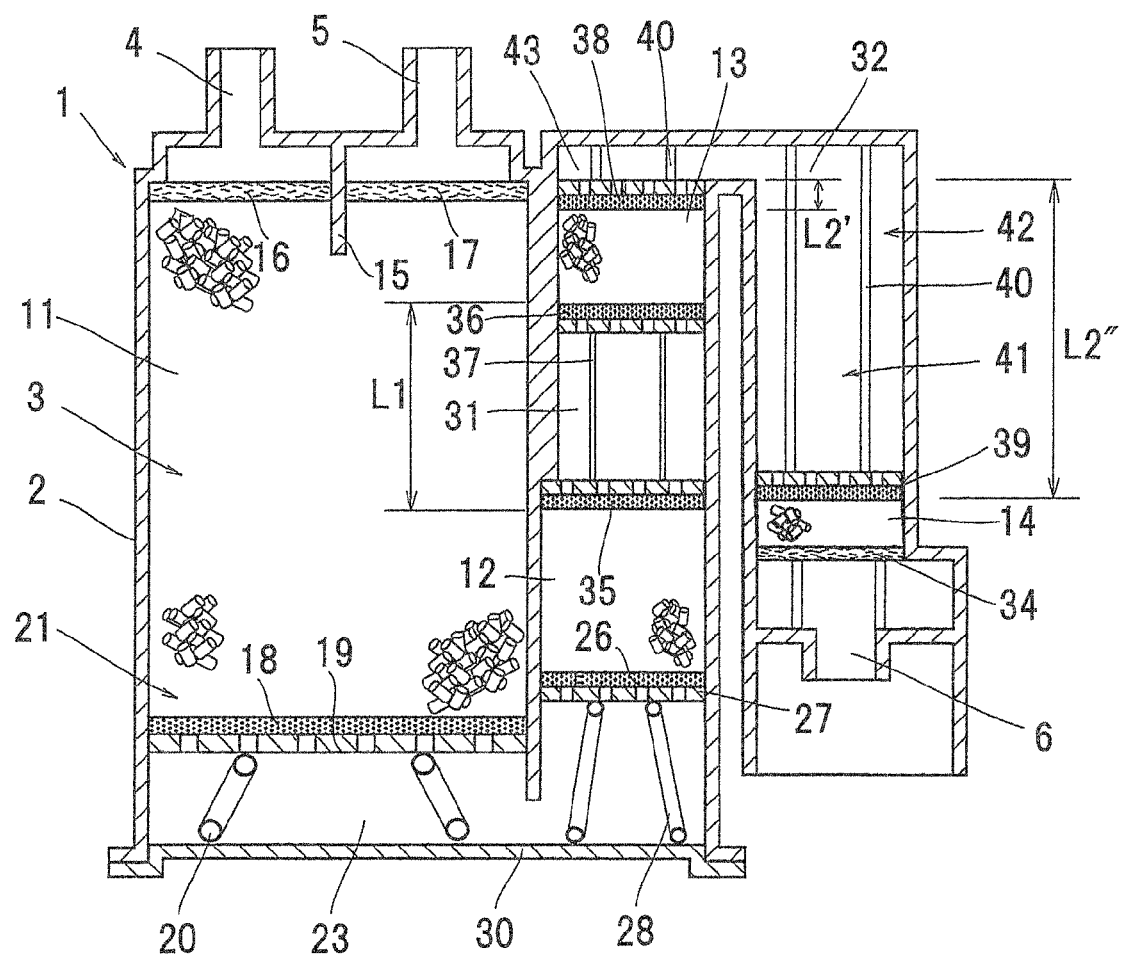
FIG. 2 is a schematic view illustrating a fuel vapor processing apparatus according to Embodiment 2 of the present invention.

While the passage 3 of a U-shape with one turnaround in the space 23 is formed inside the casing 2 in Embodiment 1, as shown in FIG. 2, for example, a passage 41 may be formed in an N-shape with two turnarounds inside the casing 2.

The structure of the first region 21 of Embodiment 2 is similar to that of the first region 21 of Embodiment 1. In Embodiment 2, a second region 42 is formed in a U-shape with one turnaround in a space 43, and one end of the second region 42 communicates with the space 23, while the other end is provided with the atmospheric air port 6.

A second adsorption layer 12 and third adsorption layer 13 similar to those of Embodiment 1 are provided between the spaces 23 and 43 inside the second region 42, and the first separation part 31 is provided between the second adsorption layer 12 and the third adsorption layer 13. A fourth adsorption layer 14 similar to the fourth adsorption layer 14 of Embodiment 1 is provided on the atmospheric air port 6 side of the space 43. A second separation part 32 is provided between the fourth adsorption layer 14 and the third adsorption layer 13.

The mutual relationships among the adsorption layers 11, 12, 13, and 14, and the separation parts 31 and 32 are set similar to those in Embodiment 1. That is, as similar to Embodiment 1, in the separation part 31 (32) inside the second region 42, when the cross-section of the separation part perpendicular to the flow direction of the passage 3 is converted into a circle having the same cross-sectional area, the distance L1 (L2) separating the adjacent adsorption layers 12 and 13 (13 and 14) is set larger than the mean value of the diameters of the entire separation part 31 (32) in the flow direction, and the distance L2 separating the third adsorption layer 13 and the fourth adsorption layer 14 is set longer than the distance L1 separating the second adsorption layer 12 and the third adsorption layer 13.

In Embodiment 2, the distance corresponding to the distance L2 separating the third adsorption layer 13 and the fourth adsorption layer 14 of Embodiment 1 is the distance in the axial direction between the end surface on the atmospheric air port 6 side of the third adsorption layer 13 and the end surface on the tank port 4 side of the fourth adsorption layer 14. That is, as shown in FIG. 2, this distance is the total (L2'+L2") of a distance L2' between the end surface on the atmospheric air port 6 side of the third adsorption layer 13 and an inlet end of the end surface on the tank port 4 side of the space 43, and a distance L2" between the end surface on the atmospheric air port 6 side of the space 43 and the end surface on the tank port 4 side of the fourth adsorption layer 14.

Since the other members are similar to those of Embodiment 1, the same reference signs are given and description thereof is omitted here.

Embodiment 2 provides the same effects and advantages as Embodiment 1.

Embodiment 3

Figure 3:
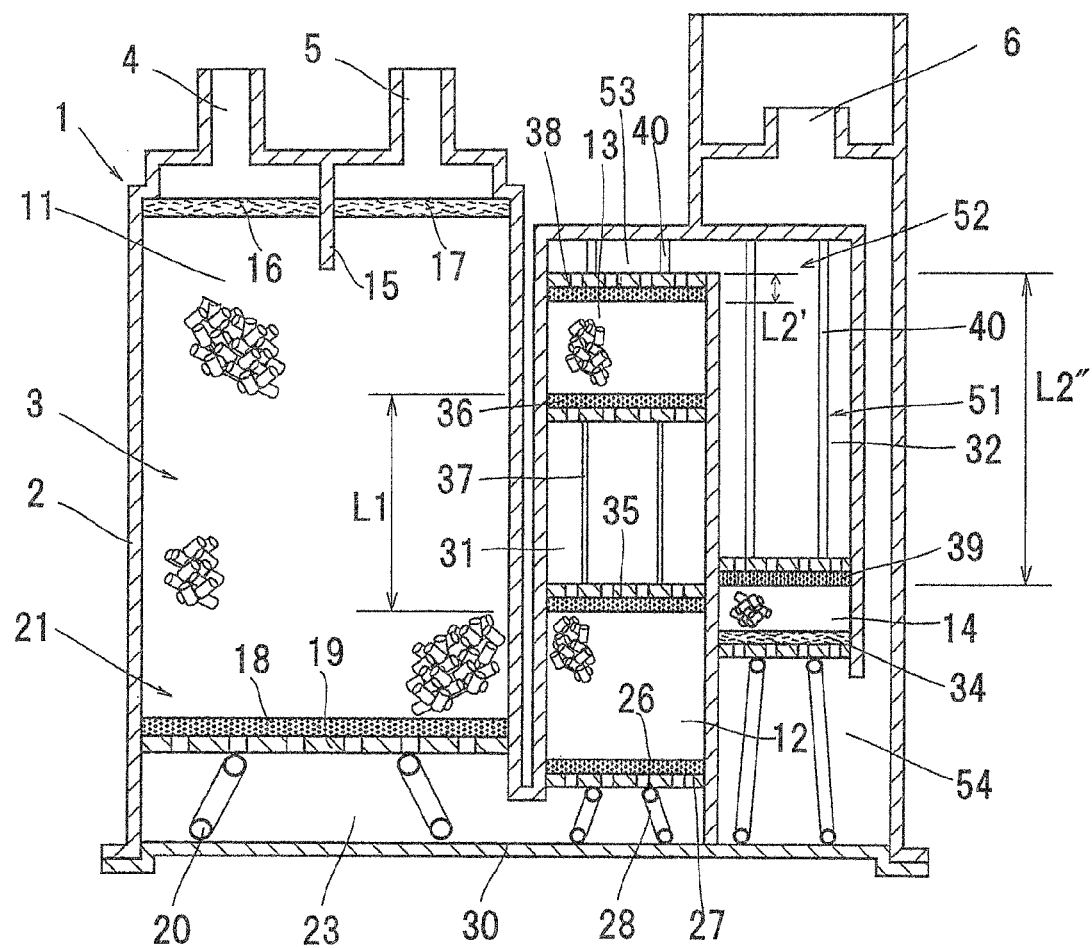
FIG. 3 is a schematic view illustrating a fuel vapor processing apparatus according to Embodiment 3 of the present invention.

Embodiment 3 differs in the shape of the passage from the passages 3 and 41 of Embodiments 1 and 2; as shown in FIG. 3, for example, a passage 51 may be formed in a W-shape with three turnarounds inside the casing 2.

The structure of the first region 21 of Embodiment 3 is similar to that of the first region 21 of Embodiment 1. In Embodiment 3, a second region 52 is formed in an N-shape with two turnarounds in spaces 53 and 54, and one end of the second region 52 communicates with the space 23, while the other end is provided with the atmospheric air port 6.

A second adsorption layer 12 and third adsorption layer 13 similar to those of Embodiment 1 are provided between the spaces 23 and 53 in the second region 52, and the first separation part 31 is provided between the second adsorption layer 12 and the third adsorption layer 13. A fourth adsorption layer 14 similar to that of Embodiment 1 is provided between the spaces 53 and 54. A second separation part 32 is provided between the fourth adsorption layer 14 and the third adsorption layer 13.

The mutual relationships among the adsorption layers 11, 12, 13, and 14, and the separation parts 31 and 32 are set similar to those in Embodiment 1.

The other members, which are similar to those of Embodiments 1 and 2, are given the same reference signs, and description thereof is omitted here.

Embodiment 3 provides the same effects and advantages as Embodiments 1 and 2.

Embodiment 4

Figure 4:
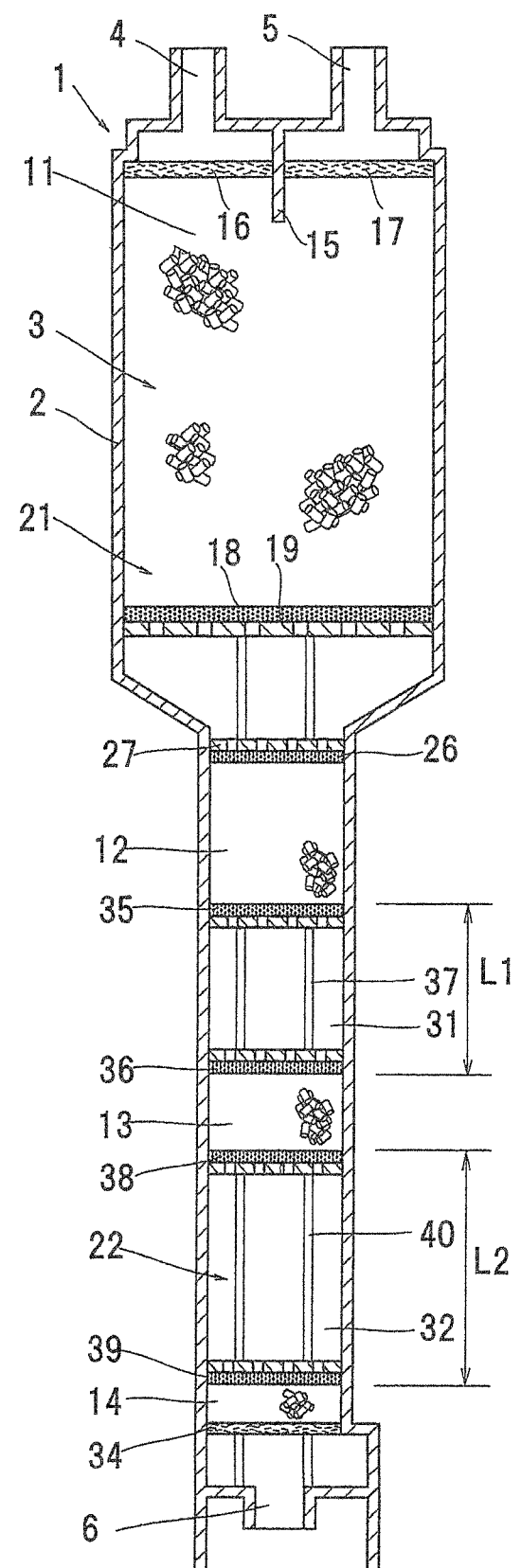
FIG. 4 is a schematic view illustrating a fuel vapor processing apparatus according to Embodiment 4 of the present invention.

While the passage 3 inside the casing 2 is formed in a U-shape with one turnaround in the space 23 in Embodiment 1, as shown in FIG. 4, for example, the passage inside the casing may be formed in an I-shape without turnarounds.

For example, as shown in FIG. 4, Embodiment 4 is a fuel vapor processing apparatus in which a first region 21 and a second region 22 are linearly arranged without turnarounds in the space.

Embodiment 4 also includes three adsorption layers and separation parts separating the adjacent adsorption layers. The closer the adsorption layer to an atmospheric air port 6, the smaller the volume of the adsorption layer. The closer the separation part to the atmospheric air port, the larger the volume of the separation part. A second region, where the volume of the separation part positioned closest to a tank port is larger than the volume of the adsorption layer positioned closest to the atmospheric air port, is provided on the atmospheric air port 6 side.

The mutual relationships among the adsorption layers 11, 12, 13, and 14, and the separation parts 31 and 32 are set similar to those in Embodiments 1 and 2.

The other members, which are similar to those of Embodiments 1 and 2, are given the same reference signs, and description thereof is omitted here.

Embodiment 4 provides the same effects and advantages as Embodiments 1 and 2.

Embodiment 5

Figure 5:
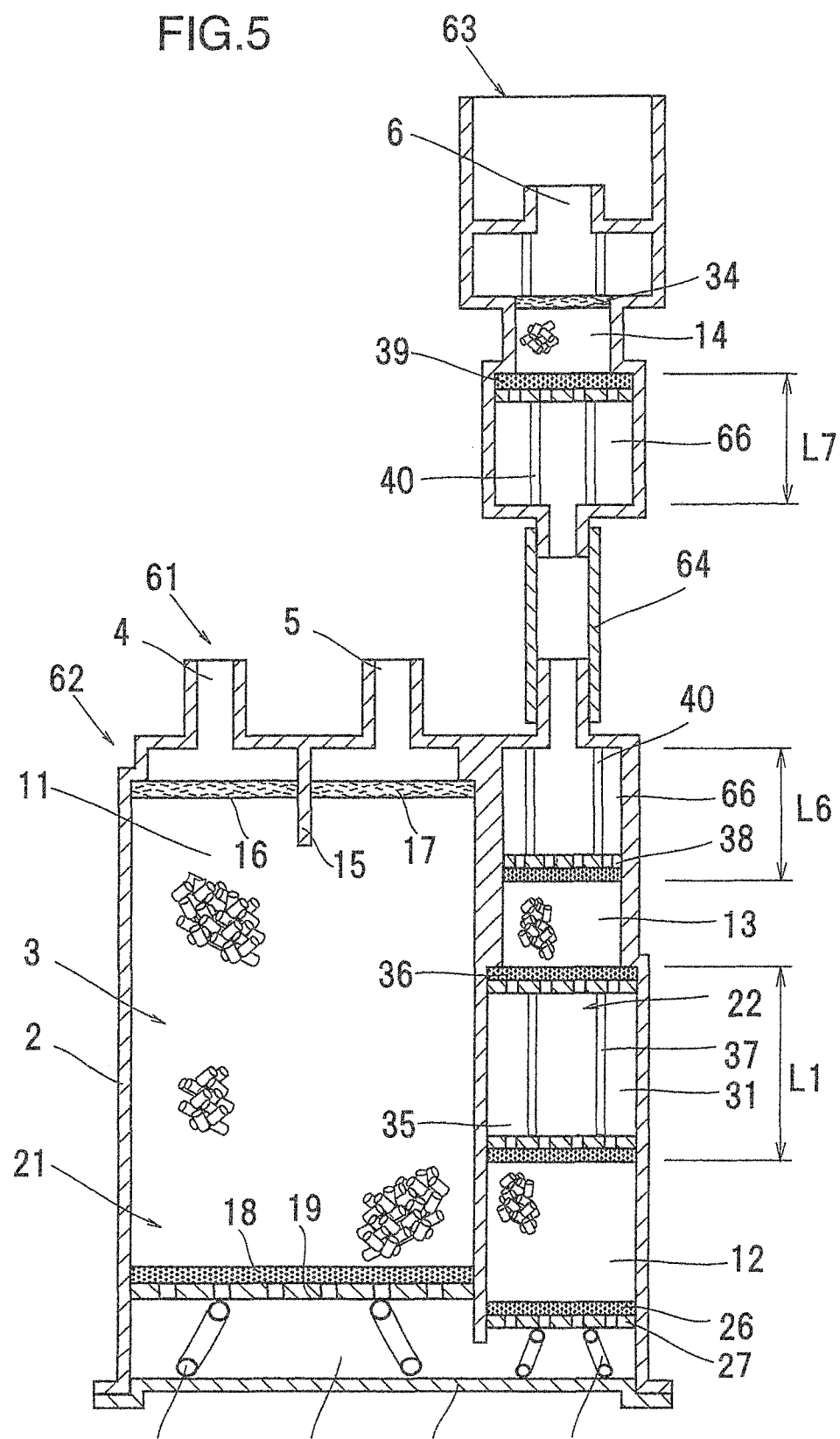
FIG. 5 is a schematic view illustrating a fuel vapor processing apparatus according to Embodiment 5 of the present invention.

FIG. 5 shows one example of Embodiment 5 of the present invention.

A fuel vapor processing apparatus 61 of Embodiment 5 includes a main canister 62 and a sub-canister 63, and the main canister 62 and the sub-canister 63 communicate with each other through a communication pipe 64.

As similar to Embodiment 1, a first region 21 and a second region 22 are formed inside the main canister 62, and the first adsorption layer 11 is provided in the first region 21, while a second adsorption layer 12 and a third adsorption layer 13 similar to those of Embodiment 1 are provided in the second region 22, with a first separation part 31 being provided between the second adsorption layer 12 and the third adsorption layer 13. A fourth adsorption layer 14 similar to that of Embodiment 1 is provided in the sub-canister 63. A second separation part 66 is formed across the second region 22 and the sub-canister 63 between the third adsorption layer 13 and the fourth adsorption layer 14.

In Embodiment 5, the region mentioned in claim 1 corresponds to the second region 22 inside the main canister 62 and the sub-canister 63.

The mutual relationships among the adsorption layers 11, 12, 13, and 14, and the separation parts 31 and 66 are similar to those in Embodiments 1 and 2.

In Embodiment 5, the flow velocity is higher and the residence time is shorter in the communication pipe 64 which has a small cross-sectional area of the passage. Therefore, in Embodiment 5, the distance corresponding to the distance L2 separating the third adsorption layer 13 and the fourth adsorption layer 14 of Embodiment 1 is the distance of the space except for the communication pipe 64, namely, L6+L7 in FIG. 5. It is preferable that the adsorption layers 11, 12, 13, and 14, and the separation parts 31 and 66 are formed so as to satisfy the mutual relationships in Embodiments 1 and 2 on the basis of the distance L6+L7.

The other members, which are similar to those of Embodiments 1 and 2, are given the same reference signs, and description thereof is omitted here.

Embodiment 5 provides the same effects and advantages as Embodiments 1 and 2.

Other Embodiments

While only the first adsorption layer 11 which is the main adsorption layer is provided inside the first region 21 in Embodiments 1 to 5, multiple adsorption layers may be provided inside the first region 21, and the separation part separating the adjacent adsorption layers may be provided between the adjacent adsorption layers.

More than four adsorption layers may be provided in series inside the second region 22, 42, or 52, and the separation part separating the adjacent adsorption layers may be provided between the adjacent adsorption layers. In this case, in at least two separation parts, when the cross-section perpendicular to the flow direction of the passage is converted into a circle having the same cross-sectional area, the distance between the adjacent adsorption layers should be larger than the mean value of the diameters of the entire separation part in the flow direction.

Further, it is preferable that, in the at least two separation parts provided on the atmospheric air port 6 side, when the cross-section of the separation part perpendicular to the flow direction of the passage is converted into a circle having the same cross-sectional area, the distance between the adjacent adsorption layers is larger than the mean value of the diameters of the entire separation part in the flow direction.

It is also preferable that the closer the separation part to the atmospheric air port 6, the longer the distance between the adjacent adsorption layers.

The entire fuel vapor processing apparatus can be formed in any shape, and the adsorption layer, the separation part, the space, and the like can be formed in any number, shape, arrangement, etc., as long as a region, which includes three or more adsorption layers other than a main adsorption layer and separation parts separating the adjacent adsorption layers, and in which, in at least two separation parts, when the cross-section of the separation part perpendicular to the flow direction of the passage is converted into a circle having the same cross-sectional area, the distance between the adjacent adsorption layers is larger than the mean value of the diameters of the entire separation part in the flow direction, is provided on the atmospheric air port 6 side of the main adsorption layer.

The foregoing disclosure of specific embodiments is intended to be illustrative of the broad concepts comprehended by the invention.

The invention claimed is:

1. A fuel vapor processing apparatus comprising:
   a passage for a fluid to flow through formed inside the apparatus;
   a tank port and a purge port formed on one end side of the passage;
   an atmospheric air port formed on other end side of the passage; and
   four or more adsorption layers provided in the passage, the four or more adsorption layers being filled with an adsorbing material capable of adsorbing fuel components, wherein
   the fuel vapor processing apparatus further comprises a main adsorption layer, and a region provided on the atmospheric air port side of the main adsorption layer;
   the region is provided with three or more adsorption layers other than the main adsorption layer, and separation parts which separate the adjacent adsorption layers, and
   in at least two separation parts inside the region, when a cross-sectional area of each of the at least two separation parts perpendicular to a flow direction of the passage is converted into a circular cross-sectional area, a distance between the adjacent adsorption layers is set larger than the mean value of diameters of the each separation part.

2. The fuel vapor processing apparatus according to claim 1, wherein a distance between adjacent adsorption layers in the region is set longer as a separation part separating the adjacent adsorption layers is closer to the atmospheric air port.

3. The fuel vapor processing apparatus according to claim 1, wherein an adsorption layer which is positioned closest to the atmospheric air port in the region is constituted of activated carbon having a butane working capacity according to ASTM D5228 of 14.5 g/dL or larger.

4. The fuel vapor processing apparatus according to claim 1, wherein the adsorption layer which is disposed closest to the tank port in the fuel vapor processing apparatus is constituted of pulverized carbon.

5. The fuel vapor processing apparatus according to claim 1, wherein the volume of the adsorption layers in the region is 12% or less of a total volume of the adsorption layers in the fuel vapor processing apparatus.

6. The fuel vapor processing apparatus according to claim 1, wherein the ratio between the cross-sectional area perpendicular to the flow direction of the passage in an adsorption layer in the region and the cross-sectional area perpendicular to the flow direction of the passage in the main adsorption layer is within a range of 1:2.5 to 1:4.5.

\* \* \* \* \*